(12) United States Patent
Wobben

(10) Patent No.: US 7,124,631 B2
(45) Date of Patent: Oct. 24, 2006

(54) WIND POWER INSTALLATION AND METHOD AND APPARATUS FOR USE IN ASSOCIATION THEREWITH

(76) Inventor: Aloys Wobben, Argestrasse 19, D-26607 Aurich (DE)

( * ) Notice: Subject to any disclaimer, the term of this patent is extended or adjusted under 35 U.S.C. 154(b) by 25 days.

(21) Appl. No.: 10/471,394

(22) PCT Filed: Mar. 14, 2002

(86) PCT No.: PCT/EP02/02848

§ 371 (c)(1),
(2), (4) Date: Jan. 23, 2004

(87) PCT Pub. No.: WO02/079645

PCT Pub. Date: Oct. 10, 2002

(65) Prior Publication Data

US 2004/0112131 A1    Jun. 17, 2004

(30) Foreign Application Priority Data

Mar. 17, 2001 (DE) .................... 101 13 039

(51) Int. Cl.
*G01P 5/00* (2006.01)
(52) U.S. Cl. .................... 73/170.15; 73/170.01; 73/170.11
(58) Field of Classification Search . 73/170.01–170.15
See application file for complete search history.

(56) References Cited

U.S. PATENT DOCUMENTS 4,297,076 A    10/1981  Donham et al.
4,435,647 A    3/1984   Harner et al.
4,730,485 A *  3/1988   Franklin et al. ......... 73/170.15
4,733,361 A    3/1988   Krieser et al.
4,812,844 A *  3/1989   Kallstrom ................. 340/949
6,158,278 A *  12/2000  Klinefelter .............. 73/170.05

FOREIGN PATENT DOCUMENTS

DE   33 08 566    11/1987
DE   252 640      12/1987
DE   198 60 215   3/2000
EP   0 327 865    8/1989

* cited by examiner

*Primary Examiner*—Edward Lefkowitz
*Assistant Examiner*—Jermaine Jenkins
(74) *Attorney, Agent, or Firm*—Neil A. Steinberg; Mark Steinberg

(57) ABSTRACT

The present invention concerns an apparatus for monitoring a wind power installation, with at least one sensor for detecting measurement values, and also a method of monitoring a wind power installation, in which: (i) a measurement value is detected with at least one sensor, (ii) the measurement value is converted into a signal representative of the measurement value, and (iii) the signal is stored and/or processed in accordance with a predetermined method. In one aspect, in order to provide an apparatus and a method which permit reliable detection of the loading on the pylon of the wind power installation, there is provided at least one sensor for detecting the loading on the pylon, the sensor being arranged in the region of the base of the pylon. In addition, the instantaneous loading on the wind power installation is ascertained from the signal representative of the measurement value ascertained by the sensor.

28 Claims, 3 Drawing Sheets

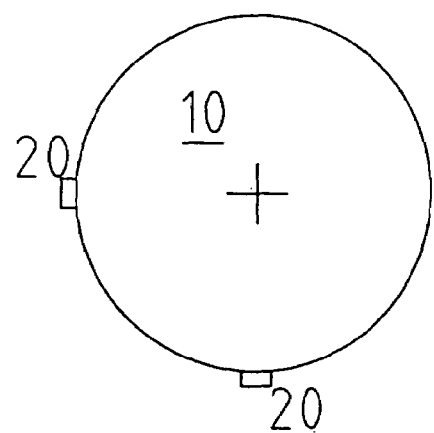
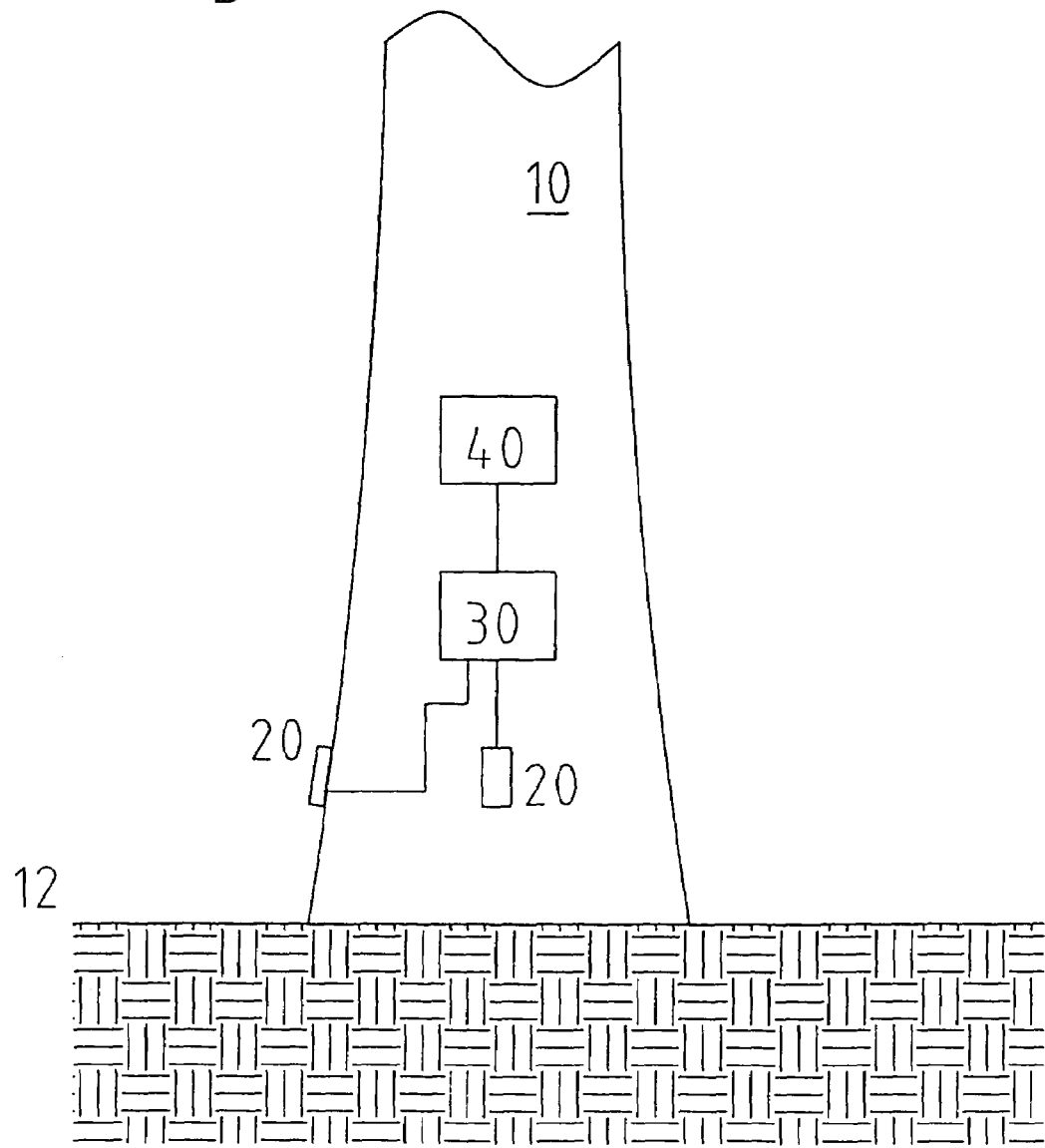

WIND POWER INSTALLATION AND METHOD AND APPARATUS FOR USE IN ASSOCIATION THEREWITH

RELATED INFORMATION

The present invention concerns a wind power installation having a monitoring apparatus, with at least one sensor for detecting measurement values, and also a method of monitoring a wind power installation, in which a) a measurement value is detected with at least one sensor, b) said measurement value is converted into a signal representative of the measurement value, and c) the signal is stored and/or processed in accordance with a predetermined method.

Such apparatuses and methods are known in the state of the art. The journal 'Erneuerbare Energien' ['Renewable Energies'], issue July 2000, page 38, which appeared at SunMedia Verlags- und Kongressgesellschaft für Erneuerbare Energien mbH Hannover, in an article entitled 'Knackt der Rotor den Turm' ['The rotor roughs up the pylon'], mentions oscillation monitoring by means of acceleration measurement.

Issue No May 2000 of that journal, in paragraph 2 on page 37 thereof, describes that the oscillation monitors which are nowadays offered by several manufacturers involve acceleration pickups. Also described therein is a method in which dangerous frequencies are deliberately and specifically amplified by means of an electronic system.

That state of the art permits detection of oscillations of the head of the pylon in certain frequency ranges. Those oscillations form a part of the loadings on the pylon. In that respect the pylon is designed for a predetermined total of loadings during its intended service life of for example 20 years.

Each loading makes a contribution to material fatigue. It is therefore easy to understand that, at locations with a large number of high loadings, fatigue progresses more quickly than at locations with few and low loadings.

This therefore involves a differing 'mechanical' age, with an assumed identical age of the pylons in terms of time. In that respect, it can happen that, when reaching its age limit in terms of time of 20 years, the pylon which has been subjected to lower levels of loading has mechanically only experienced a loading which, in regard to the design thereof, was already intended after 15 years, so that the pylon can certainly still remain in operation. It will be appreciated that the reverse situation is also conceivable, in which a pylon has already reached a mechanical age of 20 years, after just 15 years.

With the previous arrangements, the mechanical service age of a pylon can still not be adequately detected, so that ultimately it is only possible to arrive at vague estimates about the service life of a pylon and thus one of the most important parts of the wind power installation.

SUMMARY OF THE INVENTION

An object of one aspect of the invention is to provide an apparatus and a method which permits reliable detection of the loading on the wind power installation and a reliable estimate of important parts of the wind power installation.

In one aspect, the invention is based on the realization that all loads which occur at a wind power installation act on the pylon of the installation. If the base of the pylon has experienced half the load collective, the other components such as blades, machine carrier, head of the pylon, pylon etc, can scarcely have experienced a significantly higher proportion of the load collective.

Ultimately, the load at the base of the pylon cannot correspond to a situation involving a wind speed of for example 4 m/s while the load at other components corresponds for example to a wind speed of 8 m/s. Therefore, detecting the loading on the pylon makes it possible to arrive at a conclusion about the loadings to which the wind power installation is overall exposed at its site.

As, in a simplification, the wind power installation can be viewed as a bar which is gripped at one end, it is possible to detect the sum of all loads acting on the wind power installation, at the base of the pylon. Arranging at least one sensor in the region of the base of the pylon therefore permits reliable detection of the loading on the wind power installation. At the same time it is possible to reach the sensor without aids and without involving a high degree of expenditure and complication.

In a preferred embodiment of the invention detection of the loading is effected by a sensor based on a RSG (resistance strain gauge). The loading can be reliably detected by means of such a sensor, with an adequate degree of accuracy, using tried and tested technology.

The measurement values detected by the resistance strain gauge are particularly preferably converted into analog or digital electrical signals which are representative of the measurement values. Those signals can be transmitted and subjected to further processing in a simple manner.

Such further processing can be a comparison with a limit value in order for example to be able to recognise load maxima or to ascertain when predeterminable load limits are reached or exceeded. In addition the measurement values can be cumulated and stored for subsequent processing or evaluation.

It will be appreciated that the result of the cumulation can also in turn be compared to a predeterminable limit value. In that way it is possible to consider the loading on the installation in relation to the design loads and thus to implement an estimate of the mechanical service age of the installation.

In addition the method as referred to in the opening part of this specification is developed in such a way that the instantaneous loading on the wind power installation is ascertained from the signal from the sensor. As, in extensive measurements on the prototype of a wind power installation, the correlation of the load situations at various components of the wind power installation is also ascertained, data are available, which make it possible to draw a conclusion, from the load at the base of the pylon, about the load on the other components. By virtue of cumulation of all the ascertained loadings it is possible to ascertain the overall loading on the wind power installation and thus its mechanical service age.

By virtue of a correlation of the instantaneous loading with the instantaneous wind, it is possible to check whether the ascertained instantaneous loading on the wind power installation corresponds to an approximately expected order of magnitude. It is possible in that manner to monitor satisfactory functioning of the apparatus according to the invention.

The measured loading data can also be subjected to further processing in a control apparatus of the wind power installation in such a way that, when an overload occurs, the control apparatus implements measures which result in a reduction in the loading. Such a reduction in loading can be effected for example by adjustment of the rotor blades (out of the wind) or also by a reduction in the speed of rotation of the rotor of the wind power installation. In addition the entire rotor of the wind power installation could be rotated out of the wind through a given angle, to reduce the loading.

The method according to one aspect of the invention results in a detailing of the load total which has been experienced to date by the wind power installation, in relation to the design loads. That relationship, like also individual measurement values and/or the cumulated loading, can be stored and/or processed in the installation. In addition those data can be for example regularly transmitted to a remote location such as a remote monitoring system, or called up therefrom.

An embodiment of the invention by way of example thereof is described hereinafter.

BRIEF DESCRIPTION OF THE DRAWINGS

FIG. 2 shows an arrangement of sensors.

DETAILED DESCRIPTION

Figure 1:
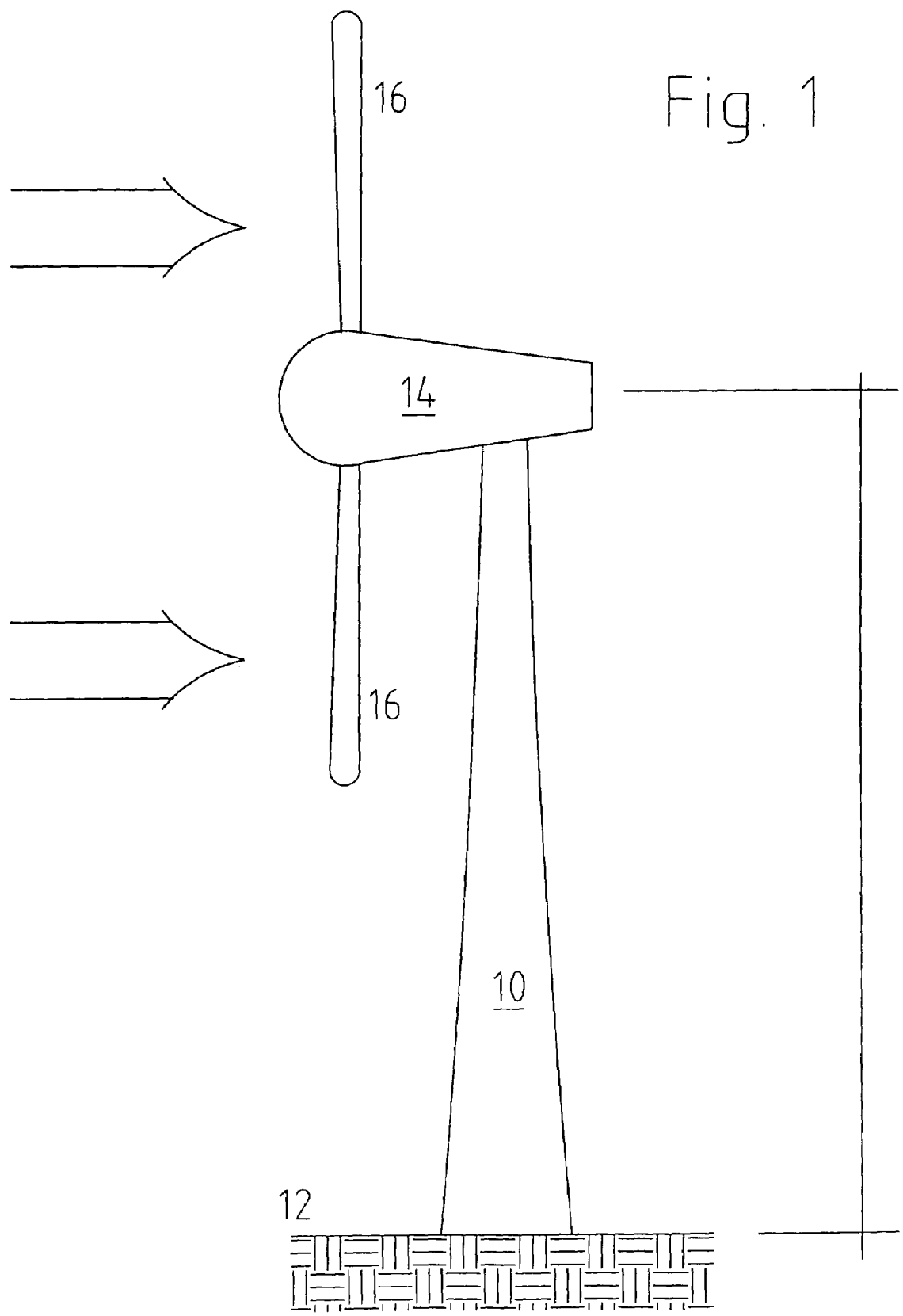
FIG. 1 is a simplified view of a wind power installation.

FIG. 1 shows a pylon 10 of a wind power installation, which is connected to a foundation 12. Arranged at the head of the pylon 10 is a pod 14 which has a rotor which rotor blades 16. In this Figure the arrow denotes the direction of the wind.

The wind rotates on the one hand the rotor and therewith the subsequently mechanically coupled part of the wind power installation in order to generate electrical energy. At the same time however on the one hand the pylon 10 is subjected to the effect of the pressure of the wind and on the other hand the pod 14 with the rotor is deflected in the direction of the wind. As a result, a bending moment occurs at the pylon 10 which is gripped at one end, over the lever arm of the length of the pylon, at the foundation 12.

The effect of the force acting on the head of the pylon produces a force pattern over the entire length of the pylon so that the alternating loads or oscillations cause a corresponding material fatigue effect.

FIG. 2 shows an arrangement of two sensors 20 in the region of the base of the pylon. Those sensors 20 can operate for example on the basis of RSGs (resistance strain gauges) and detect the stress at the base of the pylon. That stress permits a quite accurate conclusion to be drawn about the overall stress on the wind power installation. Instead of the arrangement of only two sensors it may also be advantageous under some circumstances to arrange a plurality of sensors distributed around the periphery of the base of the pylon in order in that way to afford sensors for a plurality of main wind directions, in such a fashion that the sensors can ascertain the respective maximum tensile/compression loadings which occur on the base of the pylon.

In addition the signals/data ascertained with the sensors can be subjected to further processing in a control apparatus of the wind power installation (not shown) in such a way that, when predetermined maximum values are exceeded once, a plurality of times or in a time-wise manner, the overall loading on the wind power installation is reduced, by a procedure such that for example the speed of rotation of the rotor of the wind power installation is reduced by means of the control system and/or the individual rotor blades are rotated out of the wind through a given angle, thereby reducing the loading which acts due to the rotor or the effect of the wind acting thereon.

The second device 40 can detect the electrical signals and evaluate or process them. The measurement values can be compared for example to a first limit value which marks a predetermined load limit. If the measurement value reaches or exceeds that first limit value, a signal can be triggered, which displays precisely that.

If the limit value, that is to say in the present example a load limit, is reached/exceeded in that way repeatedly, that makes it possible to conclude that there is a systematic deviation from load assumptions which have been previously made. Thereupon it is possible to restrict the cause thereof, for example incorrect control of the wind power installation or an extreme situation which is dependent on the site of the installation, so that it is possible to produce a remedy in that respect.

Mechanical ageing of the pylon can be constantly monitored by continued cumulative recording and continuous comparison with the design loads.

Storage of the load data also has the advantage that, in the event of damage possibly occurring to the pylon of the wind power installation, it is more easily possible to obtain proof of whether given overload phases have occurred and whether the maximum loadings occurring were complied with.

Finally, it is also advantageous if the measured load data of a wind power installation are acquired centrally and, in the event that the measured load data frequently or constantly exceed a given maximum value, measures can be implemented on the part of the operator in good time, to prevent premature mechanical ageing of the pylon. Such a measure for example may also involve strengthening certain elements of the wind power installation, including for example the pylon.

Instead of a resistance strain gauge, for detecting the loading it is also possible to use any other device by means of which tensile forces and/or compression forces and/or torsion forces and/or oscillations or the amplitudes thereof in the pylon and in particular the top of the pylon of a wind power installation can be detected.

Figure 3:
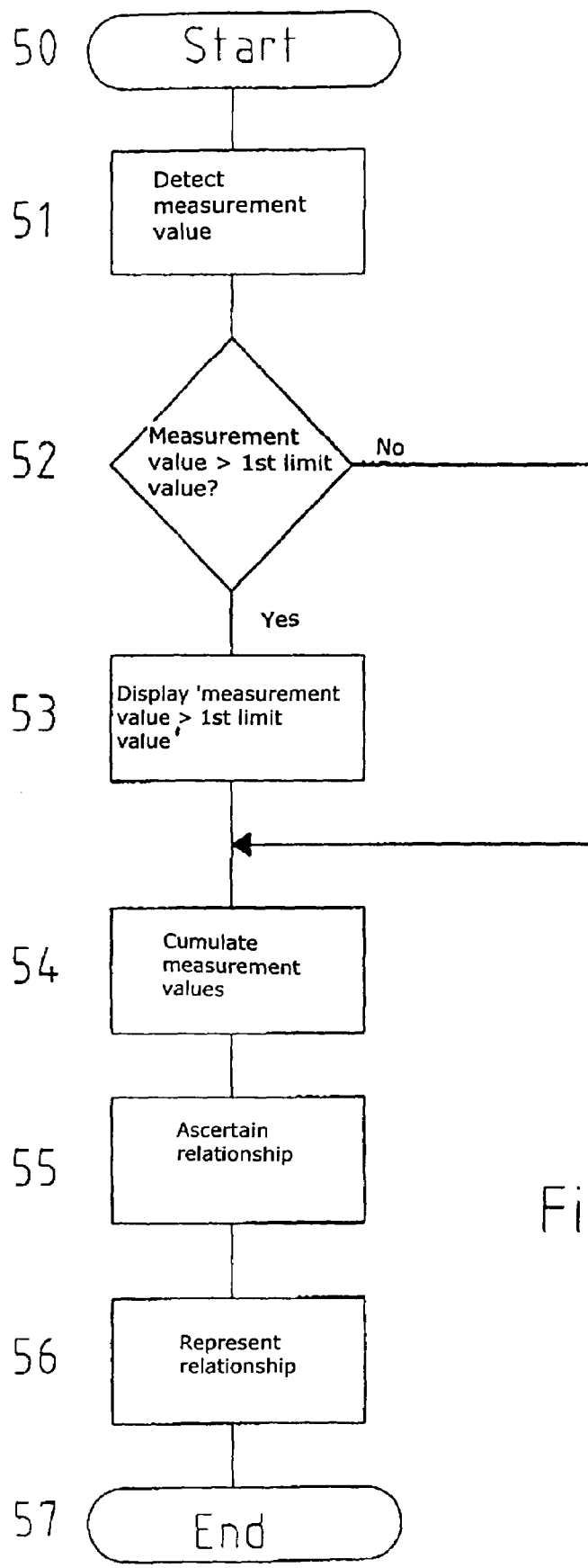
FIG. 3 shows a flow chart of the method according to the invention.

FIG. 3 shows a flow chart of a method according to the invention. The procedure begins with the step 50 and the measurement value is detected in step 51. In step 52 the detected measurement value is compared to a first limit value. If the measurement value exceeds that first limit value, it is precisely this that is indicated in step 53. If the measurement value does not exceed the first limit value the procedure misses out step 53.

In step 54 the measurement values are cumulated so that the overall loading experienced by the wind power installation to date is ascertained. That overall loading is related to the design loads in step 55. It is possible to read therefrom the mechanical service age, that is to say the load collective already experienced by the wind power installation, in relation to the design load collective. That relationship is represented in step 56 before the procedure terminates with step 57.

The representation can be effected for example after data transmission in a central remote monitoring station or at the operator of the wind power installation and can be in the form of a bar chart, a pie chart or any other suitable form of representation.

The invention claimed is:
1. A wind power installation to generate electrical energy in response to wind, the wind power installation comprising:
a pylon having a base;

a rotor, supported by the pylon, to rotate in response to wind, wherein in response to the rotation of the rotor, the wind power installation generates electrical energy;

at least one load sensor to sense loading in a region of the base of the pylon and to provide data representative of the loading; and a control device to receive the data representative of the loading and to control the wind power installation to reduce loading on the wind power installation if the data exceeds a predetermined value.

2. The wind power installation of claim 1 wherein the load sensor includes at least one sensor disposed in the region of the base.

3. The wind power installation of claim 1 wherein the load sensor includes a plurality of sensors distributed around the periphery of the base of the pylon.

4. The wind power installation of claim 1 wherein the control device controls the wind power installation to reduce a rotational speed of the rotor to reduce the loading on the wind power installation.

5. The wind power installation of claim 1 wherein the control device controls the wind power installation to rotate the rotor to reduce the loading on the wind power installation.

6. The wind power installation of claim 1 wherein the rotor includes rotor blades and the control device controls the wind power installation to adjust the rotor blades to reduce the loading on the wind power installation.

7. The wind power installation of claim 1 wherein the base of the pylon is connected to a foundation.

8. The wind power installation of claim 1 wherein the control apparatus controls the wind power installation to reduce loading on the wind power installation if the data exceeds a predetermined value a plurality of times.

9. The wind power installation of claim 1 wherein the control apparatus controls the wind power installation to reduce loading on the wind power installation if the data exceeds a predetermined value over a predetermined period of time.

10. The wind power installation of claim 1 wherein the load sensor includes a sensor based on resistance strain gauges.

11. The wind power installation of claim 1 wherein the data representative of the loading comprises analog or digital electrical signals and the load sensor includes a first device to convert the sensed loading into the analog or digital electrical signals.

12. The wind power installation of claim 11 wherein the control device compares loading values represented by the analog or digital signals to at least one predetermined first limit value and wherein the installation further includes a device to display when the predetermined first limit value is reached or exceeded.

13. The wind power installation of claim 11 further comprising a device to store loading values represented by the electrical signals.

14. The wind power installation of claim 11 further comprising a device to cumulate loading values represented by the electrical signals.

15. The wind power installation of claim 14 further comprising a device to transmit signals that represent the cumulated loading values.

16. The wind power Installation of claim 14 further comprising a device to transmit signals that represent a relationship of the cumulated loading values with a predetermined second limit value.

17. The wind power installation of claim 11 further comprising a device to transmit signals that represent individual loading values.

18. A method of controlling a wind power installation that generates electrical energy in response to wind, the installation including a pylon and a rotor supported by the pylon, the pylon including a base, the method comprising:

generating electrical energy in response to wind by rotation of the rotor;

sensing loading in a region of the base of the pylon;

providing data representative of the loading; and controlling the wind power installation to reduce loading on the wind power installation if the data exceeds a predetermined value.

19. The method of claim 18 wherein sensing loading in a region of the base of the pylon includes providing at least one sensor in the region of the base.

20. The method of claim 18 further comprising cumulating loading values represented by the electrical signals.

21. A method of monitoring a wind power installation, the method comprising:

generating electrical energy in response to wind by detecting rotation of a rotor, detecting loading on the wind power installation by means of a measurement value data pickup that provides measurement value data representative thereof; and processing the measurement value data to determine the instantaneous loading on the overall wind power installation.

22. The method of claim 21 further comprising cumulating instantaneous loadings.

23. The method of claim 22 further comprising relating the cumulated measurement values to a predetermined second limit value.

24. The method of claim 23 further comprising providing a representation of the relationship between the cumulated measurement values and the second limit value.

25. The method of claim 21 further comprising correlating instantaneous loadings with instantaneously measured wind.

26. The method of claim 21 further comprising comparing the measurement value to a predetermined first limit value and displaying attainment or exceeding of the first limit value.

27. The method of claim 21 wherein the wind power installation includes a pylon and a rotor supported by the pylon, the pylon having a base, and wherein detecting loading comprises detecting loading in a region of the base of the pylon.

28. The method of claim 21 further comprising storing the measurement value data.

* * * * *

UNITED STATES PATENT AND TRADEMARK OFFICE
CERTIFICATE OF CORRECTION

PATENT NO.         : 7,124,631 B2                                           Page 1 of 1
APPLICATION NO.  : 10/471394
DATED              : October 24, 2006
INVENTOR(S)        : Wobben It is certified that error appears in the above-identified patent and that said Letters Patent is hereby corrected as shown below:

In Col. 6, delete the text of lines 29-36 and substitute the following:

generating electrical energy in response to wind by rotation of a rotor,
    detecting loading on the wind power installation by means of a measurement value data pickup that provides measurement value data representative thereof; and
    processing the measurement value data to determine the instantaneous loading on the overall wind power installation.

Signed and Sealed this

Sixteenth Day of October, 2007

JON W. DUDAS
*Director of the United States Patent and Trademark Office*